(12) United States Patent
Price (10) Patent No.: US 12,025,999 B2
(45) Date of Patent: Jul. 2, 2024

(54) FLOW RATE CONTROL VALVE AND FLOW RATE CONTROL DEVICE

(71) Applicant: HORIBA STEC, Co., Ltd., Kyoto (JP)

(72) Inventor: Andrew Price, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 17/637,900

(22) PCT Filed: Jul. 3, 2020

(86) PCT No.: PCT/JP2020/026251
§ 371 (c)(1),
(2) Date: Feb. 24, 2022

(87) PCT Pub. No.: WO2021/044721
PCT Pub. Date: Mar. 11, 2021

(65) Prior Publication Data
US 2022/0276664 A1    Sep. 1, 2022

(30) Foreign Application Priority Data
Sep. 5, 2019   (JP) .................................. 2019-162379

(51) Int. Cl.
*G05D 7/06* (2006.01)
*F16K 1/42* (2006.01)
(Continued)

(52) U.S. Cl.
CPC .............. *G05D 7/0647* (2013.01); *F16K 1/42* (2013.01); *F16K 31/007* (2013.01);
(Continued)

(58) Field of Classification Search
CPC .......... G05D 7/0647; G05D 7/06; F16K 1/42; F16K 31/007; F16K 37/005; G01F 1/48; G01F 15/005
(Continued)

(56) References Cited

U.S. PATENT DOCUMENTS 7,150,444 B2 * 12/2006 Ohmi ........................ F16K 7/14
251/118
9,133,951 B2 * 9/2015 Ohmi ................... G05D 7/0635
(Continued)

FOREIGN PATENT DOCUMENTS

CN    1359454 A    7/2002
CN    1867794 A    11/2006
(Continued)

OTHER PUBLICATIONS

ISA Japan Patent Office, International Search Report Issued in Application No. PCT/JP2020/026251, Sep. 1, 2020, WIPO, 4 pages.
(Continued)

*Primary Examiner* — Minh Q Le
(74) *Attorney, Agent, or Firm* — Alleman Hall & Tuttle LLP (57) ABSTRACT

To provide a flow rate control valve that can improve responsiveness of flow rate control of a pressure differential type of a flow rate control device. The flow rate control valve is so configured to comprise a pair of valve members each of which has a seat surface being in contact with each other, to provide an internal flow channel that opens toward the seat surfaces and that passes through the inside of at least one of the valve members, and to control a flow rate of a fluid flowing out through the internal flow channel to the outside by adjusting a separation distance between the seat surfaces. And a restricted flow channel is formed in the internal flow channel so that a differential pressure is generated between an upstream side and a downstream side of the restricted flow channel.

6 Claims, 10 Drawing Sheets

(51) Int. Cl.
  *F16K 31/00* (2006.01)
  *F16K 37/00* (2006.01)
  *G01F 1/48* (2006.01)
  *G01F 15/00* (2006.01)

(52) U.S. Cl.
  CPC .............. *F16K 37/005* (2013.01); *G01F 1/48* (2013.01); *G01F 15/005* (2013.01); *G05D 7/06* (2013.01)

(58) Field of Classification Search
  USPC .............................................. 137/497, 487.5
  See application file for complete search history.

(56) References Cited

U.S. PATENT DOCUMENTS

| | | | | |
|---|---|---|---|---|
| 9,163,743 | B2* | 10/2015 | Hidaka | ...................... F16K 7/14 |
| 10,648,572 | B2* | 5/2020 | Sawada | ................ G05D 7/0635 |
| 11,427,911 | B2* | 8/2022 | Watanabe | ................ F16K 11/04 |
| 2010/0243076 | A1* | 9/2010 | Hayashi | ................ F16K 31/007 137/455 |
| 2012/0255630 | A1* | 10/2012 | Hayashi | ..................... F16K 1/34 137/455 |
| 2013/0048898 | A1* | 2/2013 | Hayashi | ................. F16K 47/00 251/337 |
| 2014/0203198 | A1* | 7/2014 | Jennings | ............ G05D 16/0655 251/61.1 |
| 2015/0362105 | A1 | 12/2015 | Nagase et al. | |
| 2016/0349763 | A1* | 12/2016 | Hirose | ...................... F16K 7/14 |
| 2019/0178389 | A1 | 6/2019 | Sawada et al. | |
| 2020/0348158 | A1* | 11/2020 | Sugita | .................. G05D 7/0635 |
| 2020/0348704 | A1 | 11/2020 | Sugita et al. | |
| 2022/0082416 | A1* | 3/2022 | Horiguchi | ............... G01F 1/363 |

FOREIGN PATENT DOCUMENTS

| | | |
|---|---|---|
| CN | 103912690 A | 7/2014 |
| CN | 104838240 A | 8/2015 |
| CN | 109477586 A | 3/2019 |
| EP | 1300619 A1 | 4/2003 |
| JP | 2015172813 A | 10/2015 |
| JP | 2016057319 A | 4/2016 |
| WO | 2005040655 A1 | 5/2005 |
| WO | 2014119265 A1 | 8/2014 |
| WO | 2019107215 A1 | 6/2019 |

OTHER PUBLICATIONS

China National Intellectual Property Administration, Office Action and Search Report Issued in Application No. 202080060691.8, Sep. 4, 2023, 10 pages.
Taiwan Intellectual Property Office, Office Action and Search Report Issued in Application No. 109128995, Jan. 2, 2024, 19 pages.
Japan Patent Office, Office Action Issued in Application No. 2021543634, Jan. 11, 2024, 8 pages.

* cited by examiner

FLOW RATE CONTROL VALVE AND FLOW RATE CONTROL DEVICE

FIELD OF THE ART

This invention relates to a flow rate control valve or a flow rate control device.

BACKGROUND ART

As a conventional flow rate control device in Patent Document 1, there is, for example, a differential pressure type flow rate control device that is configured to form a restricted flow channel in the middle of an external flow channel through which a fluid flowing out from a flow rate control valve flows, and to measure the flow rate of the fluid flowing out from the flow rate control valve based on the pressure difference between the upstream side and the downstream side of the restricted flow channel.

However, in the above-mentioned flow rate control device of the differential pressure type, since a restricted flow channel is formed in the middle of the external flow channel, the flow channel length until the fluid controlled by the flow rate control valve reaches the restricted flow channel becomes longer, and the flow channel volume (dead volume) thereof becomes larger. Therefore, when the valve opening degree is controlled to reduce the flow rate, it takes time for the pressure in the dead volume to change from the pressure corresponding to the valve opening degree before the change to the pressure corresponding to the valve opening degree after the change, which is a factor that reduces the responsiveness of the flow rate control.

PRIOR ART DOCUMENTS

Patent Documents

Patent document 1: Japanese Unexamined Patent Application Publication No. 2016-57319

DISCLOSURE OF THE INVENTION

Problems to be Solved by the Invention

A main object of this invention is to obtain a flow rate control valve that can improve the responsiveness of flow rate control in a differential pressure type flow rate control device.

Means to Solve the Problems

More specifically, the flow rate control valve in accordance with this invention is so configured to comprise a pair of valve members each of which has a seat surface being in contact with each other, to provide an internal flow channel that opens toward the seat surface and that passes through inside of at least one of the valve members and to control a flow rate of a fluid flowing out through the internal flow channel to the outside by adjusting a separation distance between the seat surfaces and is characterized by that a restricted flow channel is formed in the internal flow channel so that a differential pressure is generated between an upstream side and a downstream side of the restricted flow channel.

In accordance with this arrangement, since the restricted flow channel is formed in the internal flow channel that is arranged in the valve member, a flow channel volume (dead volume) from the restricted flow channel to the seat surface of the valve member where the restricted flow channel is formed becomes smaller than that of a conventional arrangement. As a result of this, in case that the valve opening degree is changed, the pressure in the dead volume changes in a short period of time from the pressure corresponding to the valve opening degree before the change to the pressure corresponding to the valve opening degree after the change. As this result, in case that the flow rate control valve is used in a differential pressure type flow rate control device, after the valve opening degree is changed, it is possible to measure the flow rate corresponding to the changed valve opening degree in a shorter period of time compared to the conventional structure so that the responsiveness of the flow rate control is improved.

In addition, the restricted flow channel may be formed from an opening in the seat surface side of the internal flow channel.

In accordance with this arrangement, it is possible to minimize the volume of the dead volume. Then, in case of using the flow rate control valve in a differential pressure type flow rate control device, it is possible to measure the flow rate corresponding to the changed valve opening degree in a shorter time after the valve opening degree is changed so that the responsiveness of the flow rate control is further improved.

In addition, the internal flow channel may discharge the fluid after the flow rate is controlled by a pair of the valve members.

In accordance with this arrangement, in case that the valve opening degree is changed so as to reduce the flow rate, the pressure in the dead volume changes in a short period of time from the pressure corresponding to the valve opening degree before the change to the pressure corresponding to the valve opening degree after the change.

Furthermore, the restricted flow channel may be formed in a fitting member that is another member different from the valve member wherein the internal flow channel is provided and that is inserted into the internal flow channel.

In accordance with this arrangement, since the restricted flow channel can be formed just by inserting the fitting member into the internal flow channel without changing the arrangement of the conventional flow rate control valve, it is possible to reduce manufacturing costs.

In addition, the fitting member may be made of ceramics.

In accordance with this arrangement, for example, in case that the restricted flow channel is formed in the fitting member, it is possible to form the restricted flow channel easily by making use of a firing process of ceramics. Concretely, a bar body, which is to be melted by firing, is inserted to penetrate a molded body before firing. After that, when the molded body is fired, the bar body melts and the restricted flow channel is formed in the molded body (fitting member) after the firing. This makes it possible to easily form the restricted flow channel in the fitting member without machining.

The restricted flow channel may be formed in the valve member wherein the internal flow channel is provided.

In accordance with this arrangement, since the restricted flow channel is directly formed on the valve member, it is possible to omit both a process of forming a fitting member separately and a process of inserting the fitting member into the internal flow channel so that a manufacturing process can be simplified compared to the case where the restricted flow channel is formed on a member different from the valve member.

In addition, a flow rate control device in accordance with this invention is characterized by comprising the above-mentioned flow rate control valve, a flow rate calculating section that calculates the flow rate of the fluid flowing out of the flow rate control valve based on each of the pressures in the upstream side and the downstream side of the restricted flow channel, and a valve opening degree control section that controls a valve opening degree of the flow rate control valve based on the flow rate calculated by the flow rate calculating section so that the flow rate of the fluid flowing out of the flow rate control valve approaches a predetermined set flow rate.

In accordance with this arrangement, since the restricted flow channel is formed in the internal flow channel arranged in the valve member, the dead volume becomes smaller than that of a conventional flow rate control device wherein a restrictor is provided in an external flow channel. With this arrangement, the pressure in the dead volume changes in a short period of time from the pressure corresponding to the valve opening degree before the change to the pressure corresponding to the valve opening degree after the change. As a result of this, it is possible to measure the flow rate according to the valve opening degree after the change in a shorter period of time than in the conventional flow rate control device so that the responsiveness of the flow rate control is improved.

In addition, the flow rate control device may further comprise a second flow rate control valve in an upstream side of the flow rate control valve.

In accordance with this arrangement, since the second flow rate control valve is provided on a primary side of the flow rate control valve, it is possible to lower the pressure on the primary side of the flow rate control valve by the second flow rate control valve. In accordance with this arrangement, it is possible to reduce the pressure difference between the upstream side and the downstream side of the flow rate control valve so that it becomes easier for the flow rate control valve to control the fluid of low flow.

In accordance with the flow rate control valve of the present claimed invention, since the restricted flow channel is formed in the internal flow channel provided in the valve member, the dead volume becomes smaller than that of a conventional structure wherein a restrictor is provided in the external flow channel. With this arrangement, in case that the valve opening degree is changed, the pressure in the dead volume changes in a short period of time from the pressure corresponding to the valve opening degree before the change to the pressure corresponding to the valve opening degree after the change. As a result of this, in case that the flow rate control valve is used in a differential pressure type flow rate control device, it is possible to measure the flow rate according to the valve opening degree after the change in a shorter period of time than in the conventional arrangement so that the responsiveness of the flow rate control is improved.

BRIEF DESCRIPTION OF THE DRAWINGS

FIGS. 7(*a*) and 7(*b*) are schematic views showing a fitting member in accordance with the first embodiment.

DESCRIPTION OF CHARACTERS

MFC flow rate control device
B main body block
11 external inlet channel
12 external outlet channel
V flow rate control valve
20 valve seat member (valve member)
21 valve seat surface (seat surface)
L internal flow channel
L1 upstream side internal flow channel
L2 downstream side internal flow channel
R restricted flow channel
30 valve body member (valve member)
31 seating surface (seat surface)
50 fitting member
P1 first pressure sensor
P2 second pressure sensor
C control section
C1 flow rate calculation section
C2 set flow rate storage section
C3 valve opening degree control section
V2 second flow rate control valve

BEST MODES OF EMBODYING THE INVENTION

A flow rate control device into which a flow rate control valve in accordance with this embodiment is incorporated is used to control, for example, a flow rate of a material gas supplied to a film deposition chamber in a semiconductor manufacturing process.

First Embodiment

Figure 1:
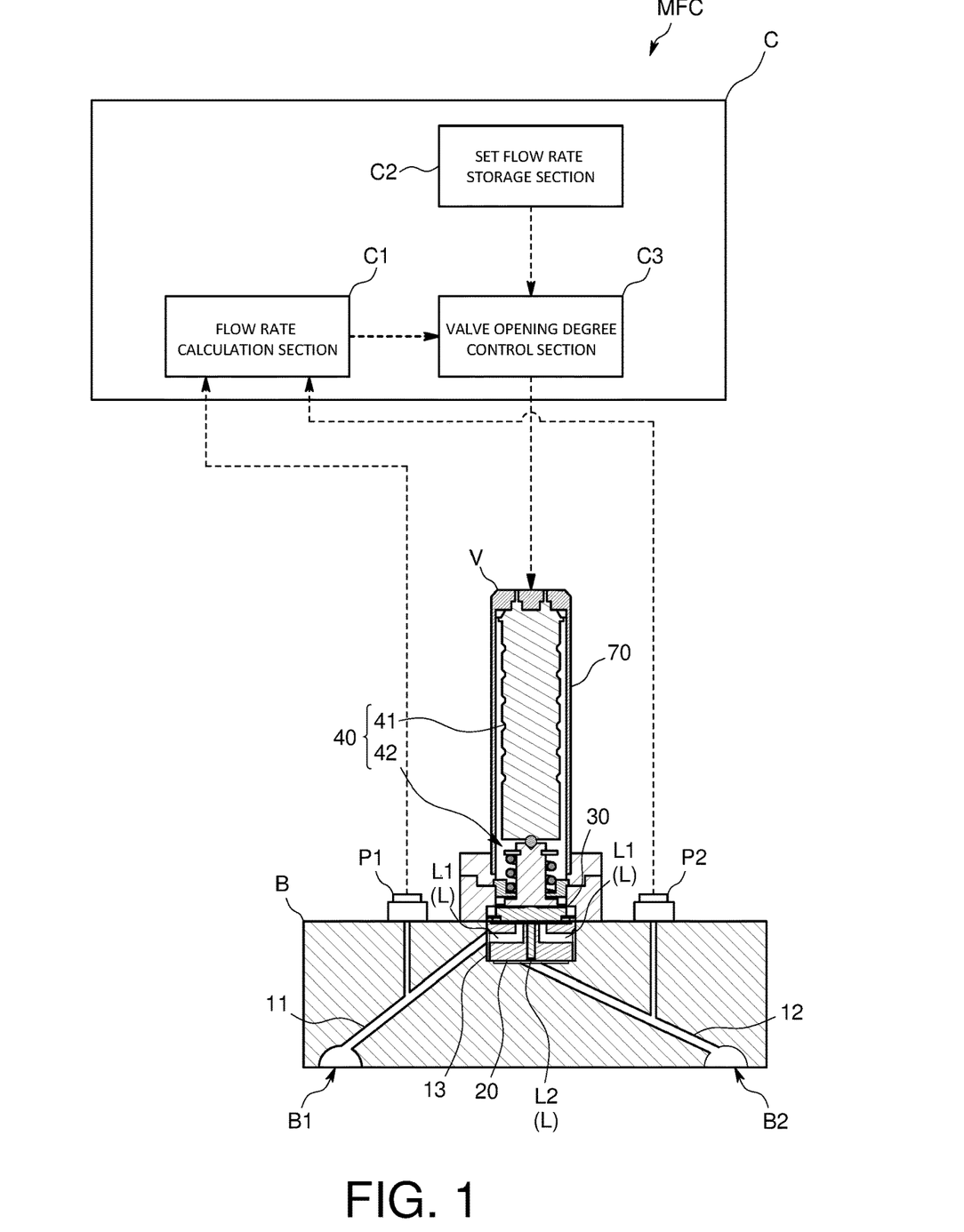
FIG. 1 is a whole schematic view showing a flow rate control device in accordance with a first embodiment.

As shown in FIG. 1, the flow rate control device (MFC) of this embodiment comprises a main body block (B), a flow rate control valve (V) arranged on one surface of the main body block (B), a first pressure sensor (P1), a second pressure sensor (P2) and a control section (C) connected to these devices.

The main body block (B) comprises an upstream side connection port B1 and a downstream side connection port B2 and also comprises an external inlet channel 11 (an external flow channel) connected to the upstream side connection port B1, an external outlet channel 12 (an external flow channel) connected to the downstream side connection port B2, and an accommodating concave section 13 arranged between the external inlet channel 11 and the external outlet channel 12.

The external inlet channel 11 has a downstream end that is open to an inner surface of the accommodating concave section 13, and the external outlet channel 12 has an upstream end that is open to the inner surface of the accommodating concave section 13. In this embodiment, the downstream end of the external inlet channel 11 is open to a side surface of the accommodating concave section 13, and the upstream end of the external outlet channel 12 is open to a bottom surface of the accommodating concave section 13.

The flow rate control valve (V) comprises a valve seat member 20 (a valve member) having a valve seat surface 21, a valve body member 30 (a valve member) having a seating surface 31 that seats on the valve seat surface 21, and an actuator 40 that drives the valve body member 30 in an approaching and/or a separating direction with respect to the valve seat member 20, and the valve seat member 20, the valve body member 30 and the actuator 40 are arranged in series in this order. The flow rate control valve (V) is configured to adjust the separation distance between the valve seat surface 21 and the seating surface 31 by driving the valve body member 30 by means of the actuator 40. The flow rate control valve (V) of this embodiment is of a so-called normally open type, and the valve body member 30 is urged in the separating direction from the valve seat member 20 by a plate spring 50 (refer to FIG. 2) supported by the valve seat member 20.

Figure 3:
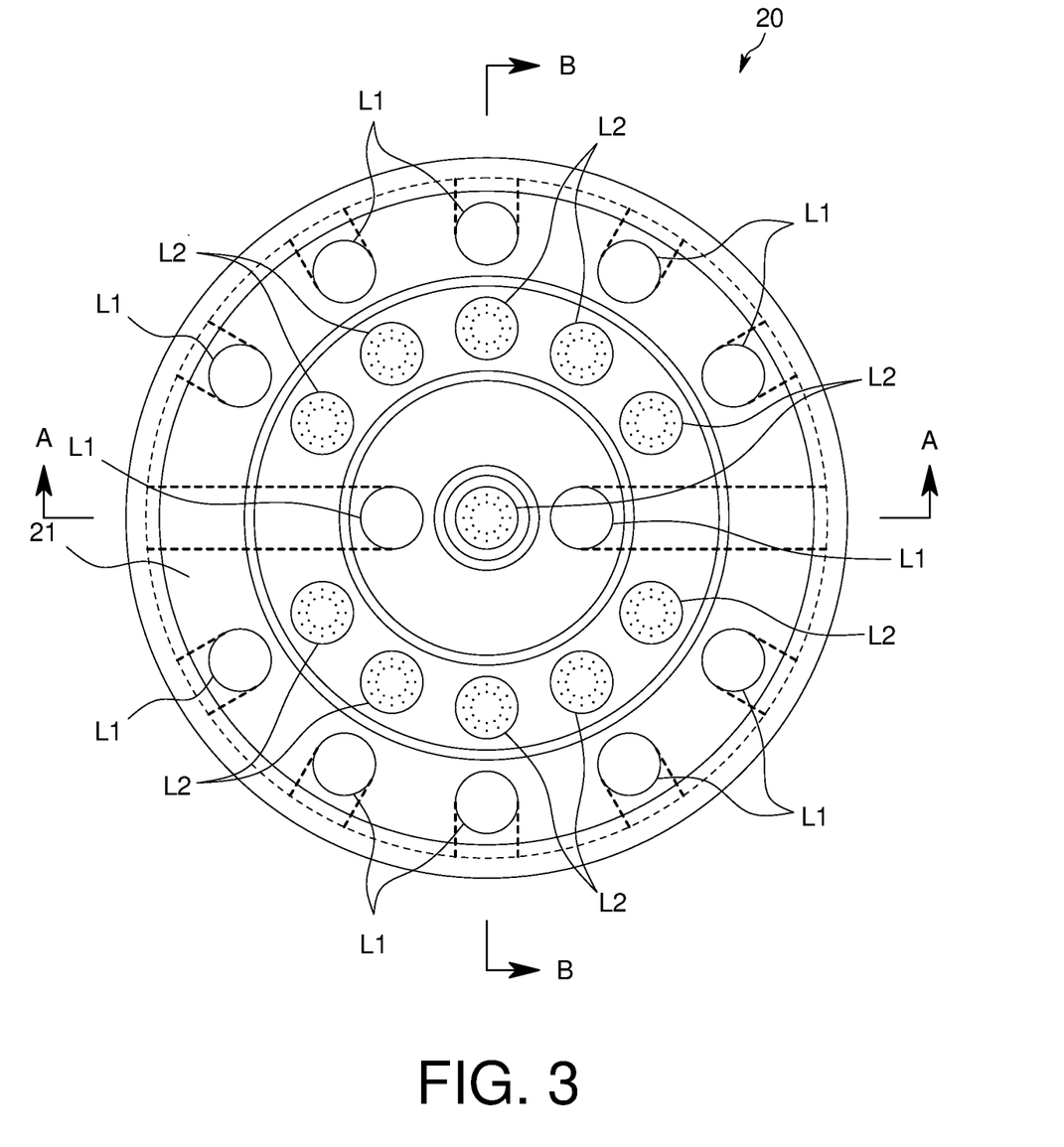
FIG. 3 is a plan view showing a valve seat member of the flow rate control valve in accordance with the first embodiment.
Figure 4:
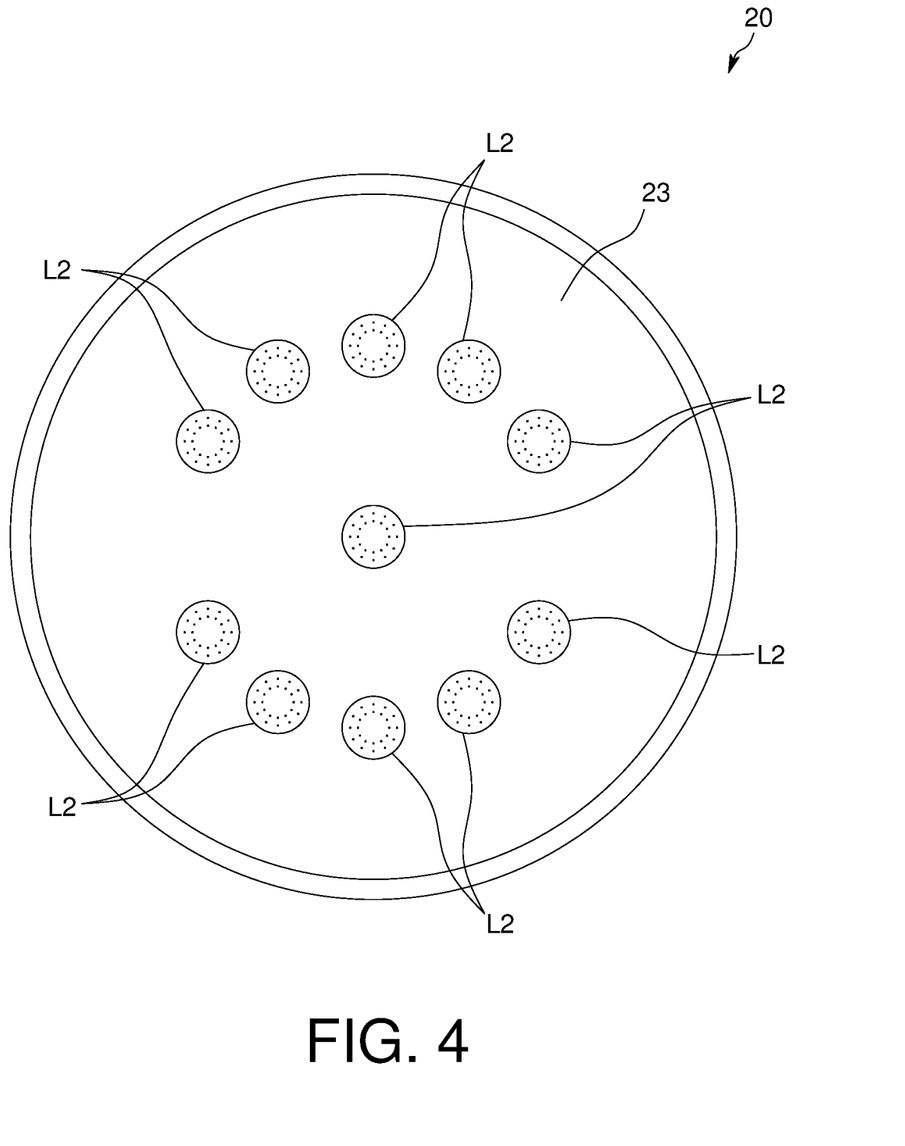
FIG. 4 is a bottom view showing the valve seat member of the flow rate control valve in accordance with the first embodiment.
Figure 5:
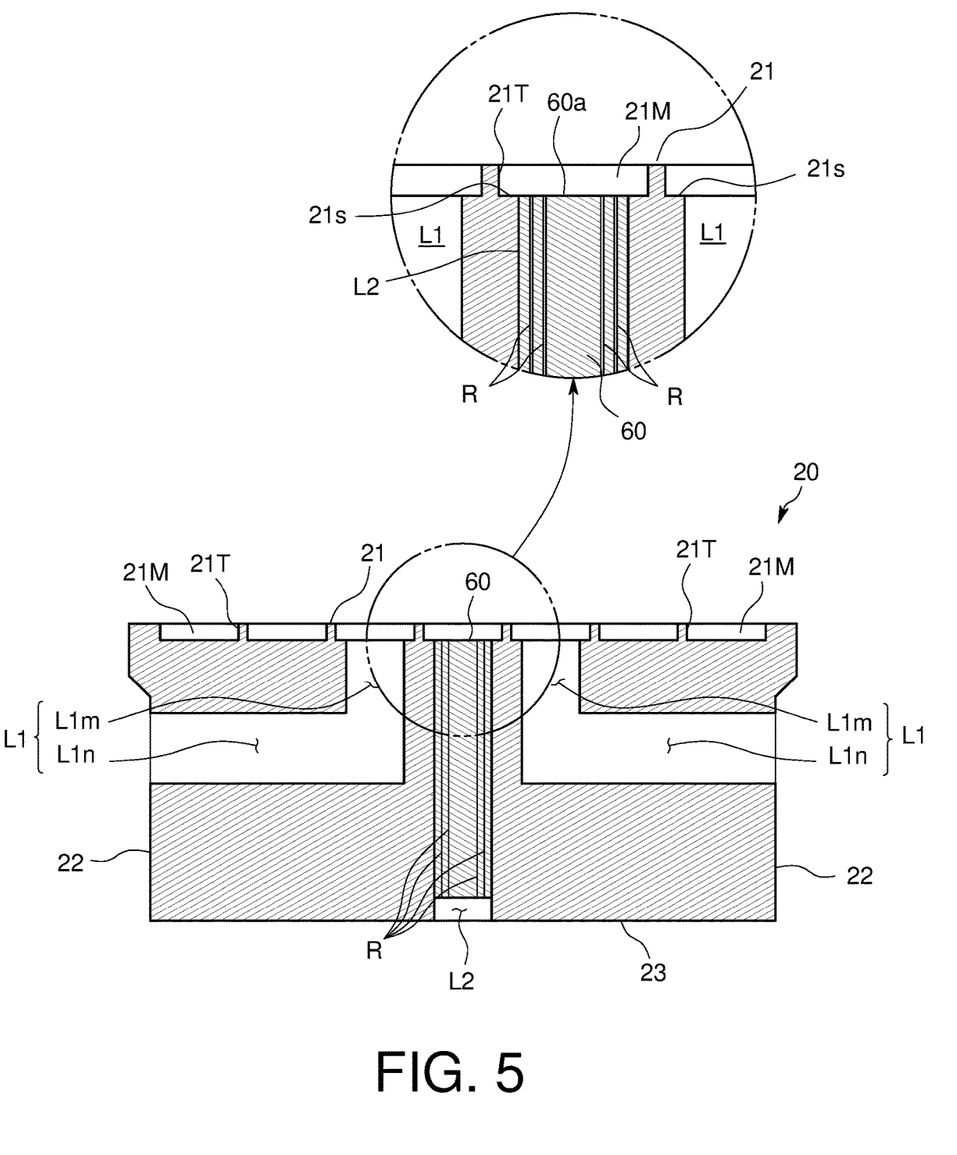
FIG. 5 is a cross-sectional view taken along a line A-A showing the valve seat member of the flow rate control valve in accordance with the first embodiment.
Figure 6:
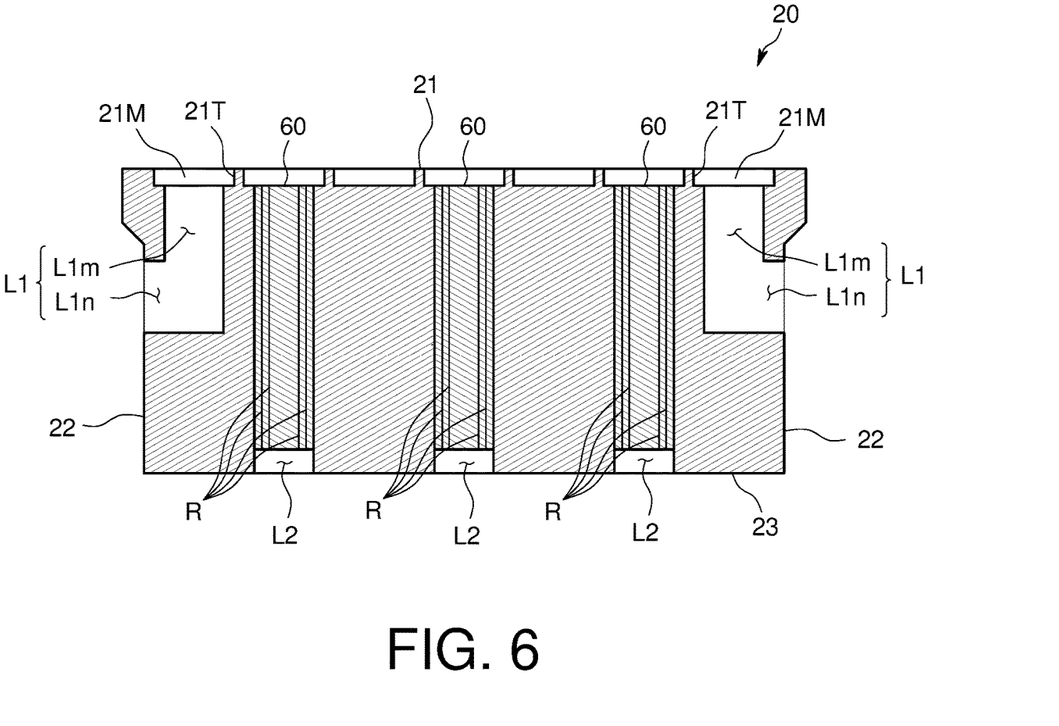
FIG. 6 is a cross-sectional view taken along a line B-B showing the valve seat member of the flow rate control valve in accordance with the first embodiment.

Next, the configuration of the above-mentioned valve seat member 20 will be described in detail based on FIG. 2 to FIG. 6. In this embodiment, FIG. 3 is a plan view of the valve seat member 20 viewed from the valve seat surface 21 side, and dotted lines indicate an upstream side internal flow channel L1 to be described later. FIG. 4 is a bottom view of the valve seat member 20 viewed from a side that is opposite to the valve seat surface 21. FIG. 5 is an A-A cross-sectional view of FIG. 3. FIG. 6 is a B-B cross-sectional view of FIG. 3.

The valve seat member 20 having a roughly rotational body shape is housed in the accommodating concave section 13, and one end surface (an upper surface in FIG. 2) facing the opening direction of the accommodating concave section 13 is the valve seat surface 21. The valve seat member 20 has an internal flow channel (L) that passes through an inner part of the valve seat member 20 and that opens toward the valve seat surface 21. Concretely, in a state wherein the valve seat surface 21 and the seating surface 31 are separated from each other, the valve seat member 20 has a plurality of the upstream side internal flow channels L1 (internal flow channels (L)) that flow the fluid into a space (a gap) formed between the valve seat surface 21 and the seating surface 31, and a plurality of the downstream side internal flow channels L2 (internal flow channels (L)) that flow the fluid out of the space.

As shown in FIG. 5 and FIG. 6, each of the upstream side internal flow channels L1 comprises a partial channel (a vertical channel) L1m that extends from the valve seat surface 21 to a predetermined position along an axial direction, and a partial channel (a horizontal channel) L1n that is communicated with the vertical channel L1m and that extends to a side peripheral surface 22 along a radial direction. In addition, each of the downstream side internal flow channels L2 extends in a straight line from the valve seat surface 21 to the bottom surface 23 along the axial direction.

Figure 2:
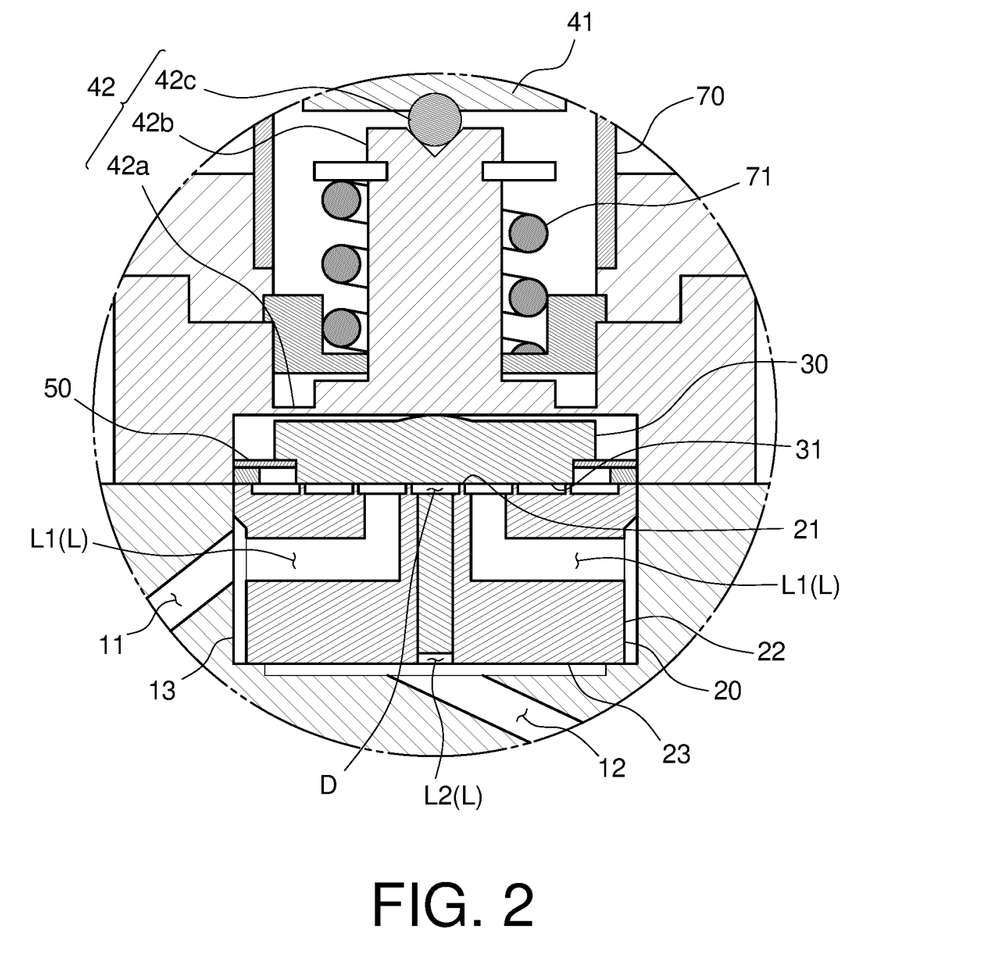
FIG. 2 is a partially enlarged cross-sectional view showing a flow rate control valve in accordance with the first embodiment.

As shown in FIG. 2, in a state wherein the valve seat member 20 is housed in the accommodating concave section 13, a flow channel that connects the external inlet channel 11 and the upstream side internal flow channel L1 of the valve seat member 20 is formed by the side peripheral surface 22 of the valve seat member 20 and the side wall forming the accommodating concave section 13. In addition, in the state wherein the valve seat member 20 is housed in the accommodating concave section 13, a flow channel that connects the external outlet channel 12 and the downstream side internal flow channel L2 of the valve seat member 20 is formed by the bottom surface 23 of the valve seat member 20 and the bottom wall forming the accommodating concave section 13.

More specifically, each of the above-mentioned upstream side internal flow channels L1 has an upstream end that opens toward the side peripheral surface 22 and a downstream end that opens toward the valve seat surface 21. In addition, each of the downstream side internal flow channels L2 has an upstream end that opens toward the valve seat surface 21 and a downstream end that opens toward the bottom surface 23.

In addition, the valve seat surface 21 has a plurality of annular concave grooves 21M formed in concentric circles and a plurality of annular convex parts 21T that divide the concave grooves 21M. The valve seat surface 21 is so configured that the upper surface of each of the annular convex parts 21T makes in contact with the seating surface 31 of the valve body member 30. In this embodiment, the upstream end of the downstream side internal flow channel L2 opens on the center of the valve seat surface 21, and three concave grooves 21M are formed and three convex parts 21T are formed so as to be concentric with the opening.

In this embodiment, the downstream end of each of the upstream side internal flow channels L1 is open to the bottom surface 21s of the concave groove 21M, and the upstream end of each of the downstream side internal flow channels L2 is open to the bottom surface 21s of the concave groove 21M that is different from the concave groove 21M wherein the downstream end of the upstream side internal flow channel L1 is open.

The valve seat surface 21 is so formed that the concave groove 21M wherein the downstream end of the upstream side internal flow channel L1 opens and the concave groove 21M wherein the upstream end of the downstream side internal flow channel L2 opens are alternate with each other. In accordance with this arrangement, in a state that the valve seat surface 21 and the seating surface 31 are separated, the upstream side internal flow channel L1 and the downstream side internal flow channel L2 are communicated with each other, while in a state that the valve seat surface 21 and the seating surface 31 are in contact, the upstream side internal flow channel L1 and the downstream side internal flow channel L2 are not communicated with each other.

With this arrangement, the fluid that flows into the accommodating concave section 13 from the external inlet channel 11 is branched through a plurality of the upstream side internal flow channels L1, merges again through a plurality of the downstream side internal flow channels L2, and then flows out to the external outlet channel 12.

In addition, a restricted flow channel (R) is formed in the internal flow channel (L) so as to generate a differential pressure between the upstream side and the downstream side of the restricted flow channel (R). In this embodiment, the restricted flow channel (R) is formed in the downstream side internal flow channel L2. More specifically, in this embodiment, the restricted flow channel (R) is formed in a portion of the internal flow channel (L) where the fluid flows after the flow rate is controlled by the valve seat member 20 and the valve body member 30. The restricted flow channel (R) has an inner diameter that is at least smaller than the inner diameter of the internal flow channel (L).

Figure 7A:
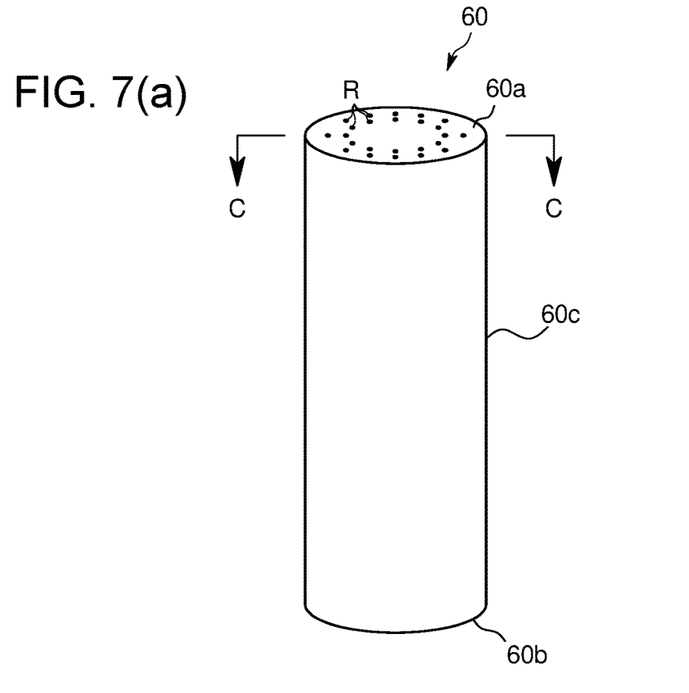
Figure 7B:
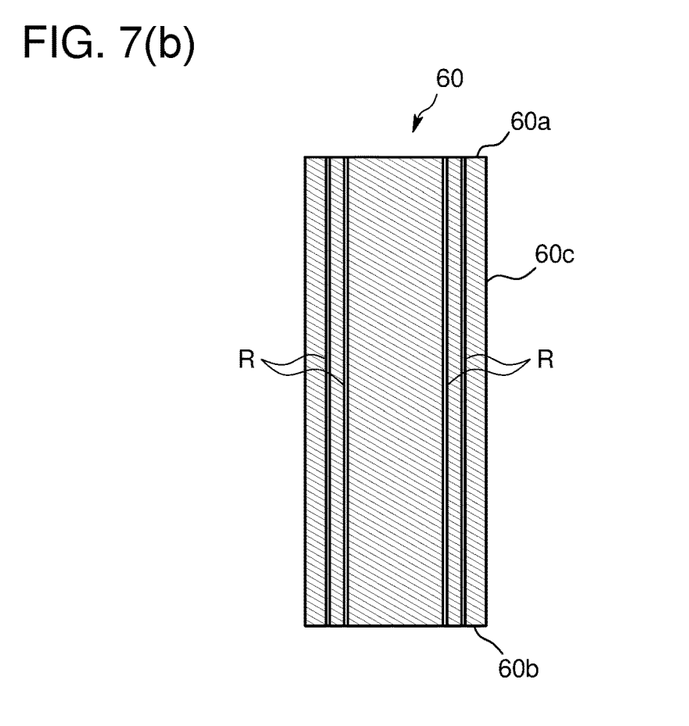

The restricted flow channel (R) of this embodiment is formed in a fitting member 60, shown in FIGS. 7(a) and 7(b), which is inserted into the downstream side internal flow channel L2. Concretely, the fitting member 60 is cylindrical and has a plurality of restricted flow channels (R) that penetrate from one end surface 60a (the upper surface in FIG. 5 to FIG. 7(b)) facing to an upstream side to the other end surface 60b (the lower surface in FIG. 5 to FIG. 7(b)) facing to a downstream side in a state wherein the fitting member 60 is inserted into the downstream side internal flow channel L2. In addition, the fitting member 60 has an outer peripheral surface 60c that closely attaches to an inner peripheral surface of the downstream side internal channel L2 in a state wherein the fitting member 60 is inserted into the downstream side internal channel L2. A plurality of the restricted flow channels (R) extend in a straight line from the end surface 60a to the other end surface 60b of the fitting member 60. In addition, a plurality of the restricted flow channels (R) are lined up to form an annular row around the central axis of the fitting member 60 when viewed from the end surface 60a side of the fitting member 60. Furthermore, a plurality of the restricted flow channels (R) are arranged at equal intervals along the circumferential direction when viewed from the end face 60a side of the fitting material 60. In this embodiment, a plurality of the restricted flow channels (R) are lined up to form a multiple ring (specifically, a double ring) row around the central axis of the fitting member 60.

In addition, the fitting member 60 is inserted so that the end surface 60a facing the valve seat surface 21 side of the downstream side internal flow channel L2 is flush with the bottom surface 21s of the concave groove 21M, as shown in FIG. 5. With this arrangement, the restricted flow channel (R) is so formed to extend from an opening facing the valve seat surface 21 (the seat surface) of the downstream side internal flow channel L2 (the internal flow channel) toward the other opening of the downstream side internal flow channel L2. In accordance with this arrangement, it is possible to minimize a flow channel volume (hereinafter also referred to as a dead volume (D)) from the restricted flow channel (R) to the valve seat surface 21 (the seat surface) of the valve seat member 20 (the valve member) wherein the restricted flow channel (R) is formed.

In addition, the fitting member 60 of this embodiment is made of ceramics. Concretely, first, a bar body which is to be melted by firing is inserted through the molded body before firing. When the molded body is fired after the bar body is inserted into the molded body, the bar body melts and a through bore, which serves as the restricted flow channel (R), is formed inside the molded body (the fitting member 60) after firing.

As shown in FIG. 1 and FIG. 2, the actuator 40 comprises a piezo stack 41 formed by stacking a plurality of piezo elements that expand and deform in a state wherein a voltage is applied, and a connection mechanism 42 that connects the piezo stack 41 to the valve member 30. The actuator 40 is so configured to transmit the extension of the piezo stack 41 to the valve body member 30 through the connection mechanism 42, and to press the valve body member 30 toward the valve seat member 20. The actuator 40, together with the valve body member 30, is housed in a housing case 70 that is installed on one surface of the main body block (B).

The connection mechanism 42 comprises a diaphragm 42a that makes in contact with the opposite surface to the seating surface 31 of the valve body member 30, a plunger 42b that extends from the diaphragm 42a toward the piezo stack 41, and a spherical body 43c that intervenes between the plunger 42b and the piezo stack 41. The connection mechanism 42 is urged toward the piezo stack 41 by a coil spring 71 supported in the housing case 70 in a state wherein the connection mechanism 42 is pressed by the piezo stack 41.

As shown in FIG. 1, the first pressure sensor P1 is installed on one surface of the body block (B) and is connected to the external inlet channel 11 formed inside the body block (B). With this arrangement, the first pressure sensor P1 measures the pressure in the upstream side from the restricted flow channel (R).

The second pressure sensor P2 as well as the first pressure sensor P1 is installed on one surface of the body block (B) and is connected to the external outlet channel 12 formed inside the body block (B). With this arrangement, the second pressure sensor P2 measures the pressure in the downstream side from the restricted flow channel (R).

The control section (C) is connected to each of the flow rate control valve V, the first pressure sensor P1 and the second pressure sensor P2. Concretely, the control section (C) is configured by a so-called computer comprising a CPU, a memory, an input/output means, etc. The program stored in the memory is executed to perform functions as a flow rate calculation section C1, a setting flow rate storage section C2, a valve opening degree control section C3, etc. shown in FIG. 1.

The flow rate calculation section C1 calculates the flow rate of the fluid flowing out of the flow rate control valve (V) based on the respective pressures measured by the first pressure sensor P1 and the second pressure sensor P2.

The setting flow rate storage section C2 stores the setting flow rate as being a target flow rate. The set flow rate storage section C2 is connected to the input means, not shown in drawings, and can be input by the input means.

The valve opening degree control section C3 controls the valve opening degree of the flow rate control valve (V) so that the measured flow calculated by the flow rate calculation section C1 approaches the set flow rate stored in the set flow storage section C2. Concretely, the valve opening degree control section C3 drives the actuator 40 by an opening degree control signal derived based on the measured flow rate and the set flow rate and controls the flow rate of the fluid by controlling the valve opening degree according to the value of the opening degree control signal.

Next, an operation of the flow rate control valve (V) of this embodiment will be described.

The flow rate control valve (V) of this embodiment is of a normally open type, and the valve seat surface 21 and the seating surface 31 are separated from each other in a state wherein no driving voltage is applied to the piezo stack 41 of the actuator 40. With this arrangement, the upstream side internal flow channel L1 and the downstream side internal flow channel L2 are communicated with each other. Then the fluid flowing in the external inlet channel 11 flows to the external outlet channel 12 through the internal flow channel L.

On the other hand, in a state wherein the driving voltage of a predetermined value or higher is applied to the piezo stack 41 of the actuator 40, the valve seat surface 21 and the seating surface 31 are in a contact state. With this arrangement, the upstream side internal flow channel L1 and the downstream side internal flow channel L2 are not in a connected state. Then, the fluid flowing in the external inlet channel 11 is shut off by a pair of the valve members 20, 30.

In addition, in this embodiment, since the volume of the dead volume (D) is small, there is less fluid in the dead volume (D), which is a factor to delay the pressure fluctuation in the dead volume (D) caused by the change in the valve opening degree. As a result of this, in case that the valve opening degree is changed so as to decrease the flow rate, the pressure in the dead volume (D) changes to the pressure corresponding to the changed valve opening degree in a short period of time, and the time until the flow rate corresponding to the changed valve opening degree is calculated by the flow rate calculation unit C1 after the valve opening degree is changed becomes shorter. As a result of this, the responsiveness of the flow rate control in the flow rate control device (MFC) is improved.

In accordance with the flow rate control device (MFC) of this embodiment having the above-mentioned arrangement, since the restricted flow channel (R) is formed in the downstream side internal flow channel L2, the volume of the dead volume (D) decreases. With this arrangement, in case that the valve opening degree is controlled to decrease the flow rate, the pressure in the dead volume (D) changes from the pressure corresponding to the valve opening degree before the change to the pressure corresponding to the valve opening degree after the change in a short period of time. As a result of this, the flow rate according to the valve opening degree after the change can be measured in a short period of time so that the responsiveness of the flow rate control is improved. In addition, since the restricted flow channel (R) is formed in the fitting member 60 that is inserted into the downstream side internal flow channel L2, the restricted flow channel (R) can be formed in the internal flow channel (L) without changing the structure of the conventional flow rate control valve (V). Furthermore, since the fitting member 60 is made of ceramics, it is possible to form the restricted flow channel (R) with ease.

Other Embodiments

Figure 8:
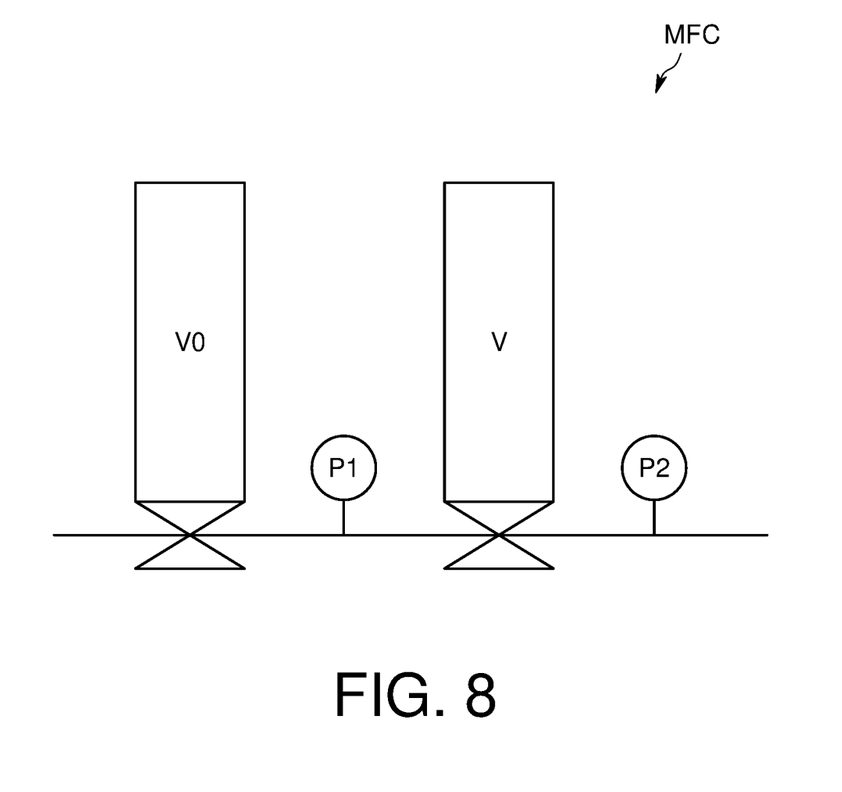
FIG. 8 is a whole schematic view showing a flow rate control device in accordance with another embodiment.

As the other embodiment, represented is a flow rate control device (MFC) having an arrangement shown in FIG. 8. The flow rate control device (MFC) shown in FIG. 8 has an arrangement wherein an upstream side flow rate control valve V0 is arranged in a further upstream side from the first pressure sensor P1 of the flow rate control device (MFC). The upstream side flow rate control valve V0 corresponds to the second flow rate control valve in the claim.

In accordance with this arrangement, since the upstream side flow rate control valve V0 is arranged in a primary side of the flow rate control valve (V), it is possible to lower the pressure in the primary side of the flow rate control valve (V) by the upstream side flow rate control valve V0. With this arrangement, the pressure difference between the upstream side and the downstream side of the flow rate control valve (V) becomes smaller so that a range of flow rate relative to the valve opening degree of the flow rate control valve (V) is lowered. As a result of this, in case of controlling the fluid of a low-flow by the use of the flow rate control valve (V), the resolution of the flow rate control valve (V) is increased so that it is possible to make it easy to control the fluid of the low-flow by using the flow rate control valve (V).

In the above-mentioned embodiment, a normally open type flow rate control valve (V) is illustrated as an example, however, it is also possible to apply the present invention to a normally closed type.

In addition, in the above-mentioned embodiment, the pressure sensors (first pressure sensor P1 and second pressure sensor P2) are arranged on each of the upstream side and the downstream side of the restricted flow channel (R), however, in case that the pressure in one of the upstream side and the downstream side of the restricted flow channel (R) is known, a pressure sensor may be arranged only in the other side. Also, a differential pressure gauge may be arranged to detect the pressure difference between the upstream side and the downstream side of the restricted flow channel (R).

In addition, in the above-mentioned embodiment, the restricted flow channel (R) is formed in the fitting member 60 that is inserted into the internal flow channel (L) formed in the valve member 20, 30, however, the restricted flow channel (R) may be formed directly in the valve member 20, 30. More specifically, the restricted flow channel (R) may be formed in the valve member 20, 30 wherein the internal flow channel (L) is arranged.

In addition, in the above-mentioned conventional flow rate control device, there is a case that a restricted part is arranged in an upstream side from the flow rate control valve in the external flow channel in order to measure the flow rate of the fluid flowing from the flow rate control valve. In this case, if the valve opening degree is controlled to increase the flow rate, it takes time for the pressure in the dead volume (D) to change from the pressure corresponding to the valve opening degree before the change to the pressure corresponding to the valve opening degree after the change. In this case, the restricted flow channel (R) may be formed in the portion (upstream side internal flow channel L1) of the internal flow channel (L) where the fluid flows before the flow rate is controlled by a pair of the valve members 20, 30. In addition, it is possible to minimize the volume of the dead volume (D) if the restricted flow channel (R) is formed to extend from the opening that faces to the seat surface side of the internal flow channel (L) to the other opening of the internal flow channel (L).

In addition, in the above-mentioned embodiment, the upstream side internal flow channel L1 and the downstream side internal flow channel L2 are formed in the valve seat member 20, however, the upstream side internal flow channel L1 and the downstream internal flow channel L2 may be formed in the valve body member 30. In addition, the upstream side internal flow channel L1 may be formed in one of a pair of the valve members 20, 30, and the downstream side internal flow channel L2 may be formed in the other. In these cases, the restricted flow channel (R) may be formed in either one of the upstream side internal flow channel L1 and the downstream side internal flow channel L2. Furthermore, only either one of the upstream side internal flow channel L1 and the downstream side internal flow channel L2 may be formed in either one of the pair of the valve members 20, 30.

Figure 9:
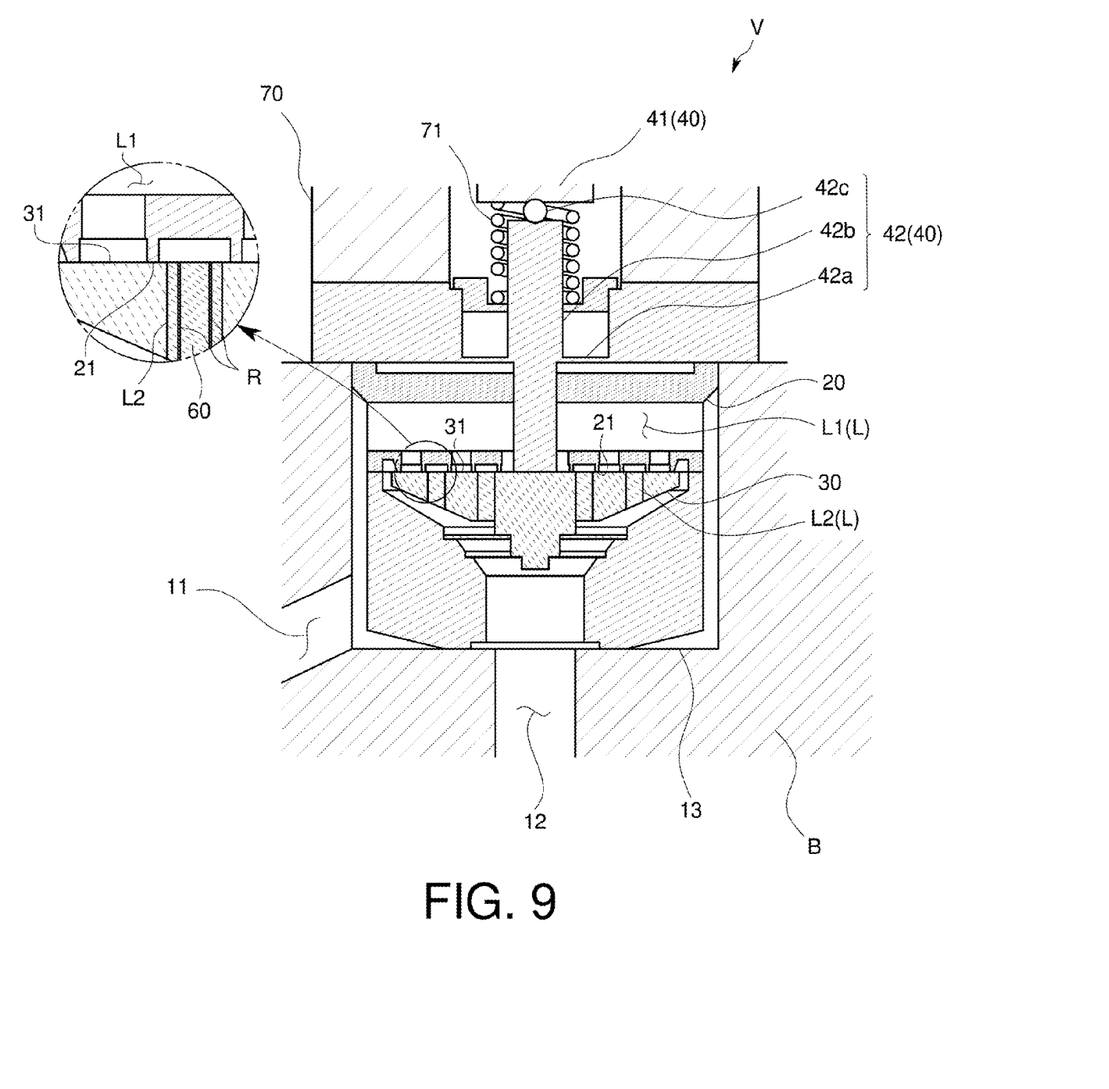
FIG. 9 is a schematic view showing a flow rate control valve in accordance with another embodiment.

For example, in case of applying the present claimed invention to a normally closed type flow rate control valve (V), as shown in FIG. 9, an upstream side internal flow channel L1 that communicates with the external inlet channel 11 formed in the body block (B) is formed in the valve seat member 20, and a downstream side internal flow channel L2 that communicates with the external outlet channel 12 formed in the body block (B) is formed in the valve body member 30 in the valve body member 30. Then, the restricted flow channel (R) may be formed in the downstream side internal flow channel L2 of the valve body member 30. The flow rate control valve (V) is so configured that the valve body member 30 is urged toward the valve seat member 20 and the separation distance between the valve seat surface 21 and the seating surface 31 is adjusted by pressing the valve body member 30 by an actuator 40 that penetrates the valve seat member 20.

Figure 10:
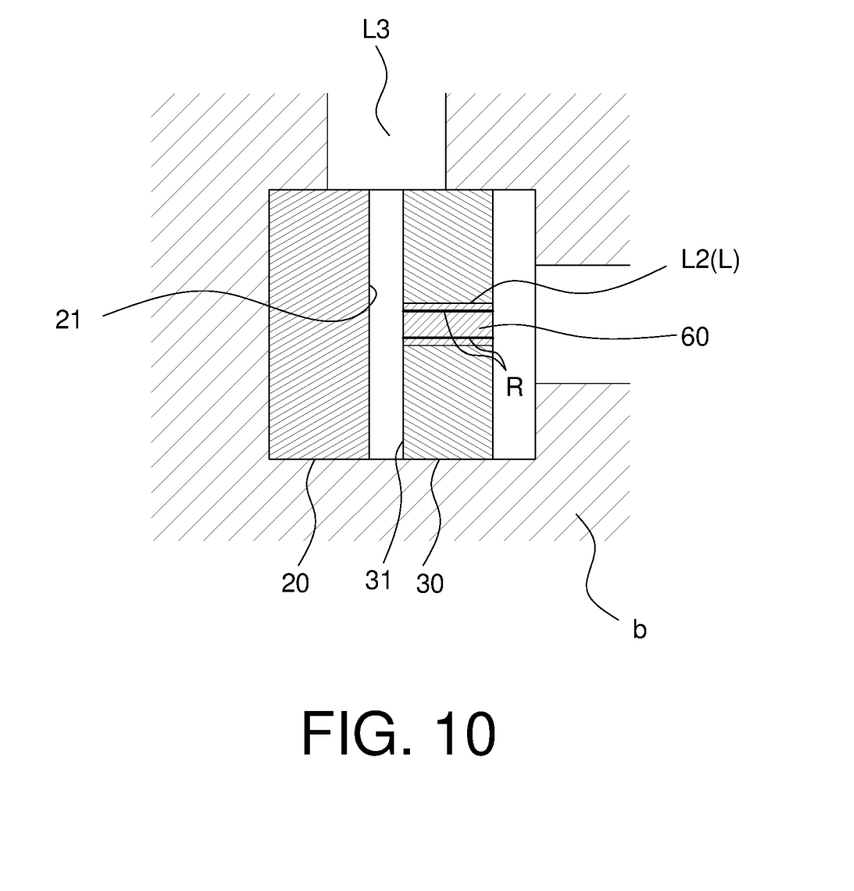
FIG. 10 is a whole schematic view showing a flow rate control valve in accordance with another embodiment.

In addition, the flow rate control valve (V) of the present claimed invention is so configured, for example, as shown in FIG. 10, to comprise a housing block (b) that houses the valve seat member 20 and the valve body member 30, and forms an upstream side flow channel L3 in the housing block (b) to flow the fluid into the space formed between the valve seat surface 21 and the seating surface 31 and the downstream side internal flow channel L2 in the valve body member 30 to flow the fluid out of the space. The restricted flow channel (R) is formed in the downstream side internal flow channel L2. This type of structure is also possible.

In addition, in the above-mentioned embodiment, the restricted flow channel (R) is formed so as to extend from an opening on the seat side of the internal flow channel (L) to the other opening of the internal flow channel (L), however, the restricted flow channel (R) may also be formed so as to extend from an inside of the opening on the seat side of the internal flow channel (L) to the other opening of the internal flow channel (L).

In addition, it is a matter of course that the present claimed invention is not limited to the above-mentioned embodiments and may be variously modified without departing from a spirit of the present claimed invention.

POSSIBLE APPLICATIONS IN INDUSTRY

It is possible to obtain a flow rate control valve that can improve the responsiveness of flow rate control in a differential pressure type flow rate control device.

The invention claimed is:

1. A flow rate control valve that is so configured to comprise a pair of valve members each of which has a seat surface being in contact with each other, to provide an internal flow channel that passes through the inside of at least one of the valve members and that opens toward the seat surfaces and to control a flow rate of a fluid flowing out through the internal flow channel to the outside by adjusting a separation distance between the seat surfaces, wherein a restricted flow channel is formed in the internal flow channel so that a differential pressure is generated between an upstream side and a downstream side of the restricted flow channel, the restricted flow channel is formed in a fitting member that is another member different from the valve member which has the internal flow channel and that is inserted in its entirety into a section of the internal flow channel that is of a uniform diameter throughout, on a side of the fitting member facing the seat surface, the restricted flow channel extends to an end surface of the fitting member without substantial tapering, and an axial length of the fitting member, which runs parallel to an insertion direction of the fitting member into the internal flow channel, is longer than a width of the fitting member.

2. The flow rate control valve described in claim 1, wherein the restricted flow channel is formed from an opening in the seat surface side of the internal flow channel.

3. The flow rate control valve described in claim 1, wherein the internal flow channel discharges the fluid after the flow rate is controlled by a pair of the valve members.

4. The flow rate control valve described in claim 3, wherein the fitting member is made of ceramics.

5. A flow rate control device comprising
a flow rate control valve described in claim 1,
a flow rate calculating section that calculates the flow rate of the fluid flowing out of the flow rate control valve based on each of the pressures in the upstream side and the downstream side of the restricted flow channel, and
a valve opening degree control section that controls a valve opening degree of the flow rate control valve based on the flow rate calculated by the flow rate calculating section so that the flow rate of the fluid flowing out of the flow rate control valve approaches a predetermined set flow rate.

6. The flow rate control device described in claim 5, further comprising a second flow rate control valve in an upstream side of the flow rate control valve.

* * * * *